(12) United States Patent
Potter et al.

(10) Patent No.: US 7,946,109 B2
(45) Date of Patent: May 24, 2011

(54) EMISSIONS CONFORMANCE FOR AN EXHAUST AFTER-TREATMENT SYSTEM HAVING A DOSING AGENT SUPPLY

(75) Inventors: Michael A. Potter, Grass Lake, MI (US); Fabien G. Redon, Southfield, MI (US); Sherif H. El Tahry, Troy, MI (US); Christopher C Wright, Howell, MI (US); John A. Pinson, Troy, MI (US)

(73) Assignee: GM Global Technology Operations LLC

( * ) Notice: Subject to any disclaimer, the term of this patent is extended or adjusted under 35 U.S.C. 154(b) by 934 days.

(21) Appl. No.: 11/639,397

(22) Filed: Dec. 14, 2006

(65) Prior Publication Data
US 2008/0141659 A1    Jun. 19, 2008

(51) Int. Cl.
*F01N 3/00* (2006.01)
*F01N 3/10* (2006.01)
*F02B 35/00* (2006.01)

(52) U.S. Cl. ............... 60/286; 60/295; 60/299; 60/300; 60/316

(58) Field of Classification Search ............... 60/286, 60/295, 299, 300, 316
See application file for complete search history.

(56) References Cited

U.S. PATENT DOCUMENTS

| 5,651,247 | A | 7/1997 | Frankle | |
|---|---|---|---|---|
| 7,197,867 | B2* | 4/2007 | Huang et al. | 60/295 |
| 2006/0184307 | A1 | 8/2006 | Kosaka | |
| 2007/0163244 | A1* | 7/2007 | Federle | 60/286 |
| 2008/0098726 | A1* | 5/2008 | Donaldson et al. | 60/286 |

FOREIGN PATENT DOCUMENTS

| CN | 1871411 A | 9/2004 |
|---|---|---|
| DE | 4425018 C1 | 6/1995 |
| DE | 102005022420 | 6/2006 |
| DE | 102006000074 | 9/2006 |

OTHER PUBLICATIONS

Brent D. Hendrickson; Entitled: "Method of Monitoring A Dosing Agent Supply for Treating Exhaust"; Filed Dec. 14, 2006; 23 Pages.
David B. Brown; Entitled: "Diesel Exhaust Control During Limp-Home Mode"; Filed Dec. 14, 2006; 26 Pages.
Chinese Office Action dated Sep. 19, 2010 in Chinese Application No. 200710300948.9.

* cited by examiner

*Primary Examiner* — Thomas E Denion
*Assistant Examiner* — Michael Carton

(57) ABSTRACT

An exhaust after-treatment system for a vehicle including a dosing agent that is selectively injected into an exhaust from a dosing agent supply includes a first module that determines a level of a dosing agent source. A second module selectively impedes vehicle operation by adjusting an engine operating mode if the level of said dosing agent source is below a threshold level.

19 Claims, 4 Drawing Sheets

EMISSIONS CONFORMANCE FOR AN EXHAUST AFTER-TREATMENT SYSTEM HAVING A DOSING AGENT SUPPLY

CROSS-REFERENCE TO RELATED APPLICATIONS

This application is related to U.S. Ser. No. 11/639,369 filed on Dec. 14, 2006, entitled, "Method of Monitoring A Dosing Agent Supply For Treating Exhaust", and U.S. Ser. No. 11/639,370 filed on Dec. 14, 2006, entitled, "Diesel Exhaust Control During Limp-Home Mode". The disclosures of the above applications are incorporated herein by reference.

FIELD OF THE INVENTION

The present invention relates to vehicle exhaust systems, and more particularly to a method of extending emissions performance under a reduced or depleted exhaust treatment system dosing agent supply.

BACKGROUND OF THE INVENTION

Internal combustion engines combust an air and fuel mixture to generate drive torque. The combustion process generates exhaust that is exhausted from the engine to atmosphere. The exhaust contains nitrogen oxides (NOx), carbon dioxide ($CO_2$) and carbon monoxide (CO) and particulates. An exhaust after-treatment system treats the exhaust to reduce regulated emissions prior to being released to atmosphere.

In an exemplary exhaust after-treatment system, a dosing system injects a dosing agent (e.g., urea) into the exhaust upstream of a catalyst. The exhaust and dosing agent mixture reacts over the catalyst to reduce the level of emissions. The dosing system includes a dosing agent supply and an injector. The amount of dosing agent injected is based on the level of emissions in the exhaust. If the dosing agent supply is empty or at a low level, insufficient dosing agent is injected into the exhaust stream and emissions are not reduced as desired.

SUMMARY OF THE INVENTION

Accordingly, the present invention provides an exhaust after-treatment system for a vehicle including a dosing agent that is selectively injected into an exhaust from a dosing agent supply. The system includes a first module that determines a level of a dosing agent source, and a second module that selectively impedes vehicle operation by adjusting an engine operating mode if the level of said dosing agent source is below a threshold level.

In other features, the vehicle operation is impeded by at least one of reducing a fueling rate to an engine of the vehicle, limiting the operating speed of the engine, limiting the operating speed of the vehicle, limiting the acceleration ability of the vehicle and altering a combustion mode of the engine. The fueling rate is determined based on the level of the dosing agent source. In one embodiment, the threshold level corresponds to a low condition of the dosing agent source, and the fueling rate and a dosing rate are regulated to achieve a desired emissions performance. In another embodiment, the vehicle speed is regulated to achieve a desired emission performance. In another embodiment, the combustion mode is altered to be a pre-mixed charge compression ignition (PCCI) combustion mode. In still another embodiment, these actions are combined to achieve the desired emission performance.

In another feature, the threshold level corresponds to an empty dosing agent source, and at least one of reducing a fueling rate to an engine of the vehicle, limiting the operating speed of the engine, limiting the operating speed of the vehicle, limiting the acceleration ability of the vehicle and altering a combustion mode of the engine is performed to achieve a desired emissions performance.

In still another feature, the vehicle operation is impeded by rendering the vehicle unable to drive.

In yet another feature, the second module discontinues inhibiting vehicle operation when the dosing agent source is replenished to raise the level above the threshold level.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
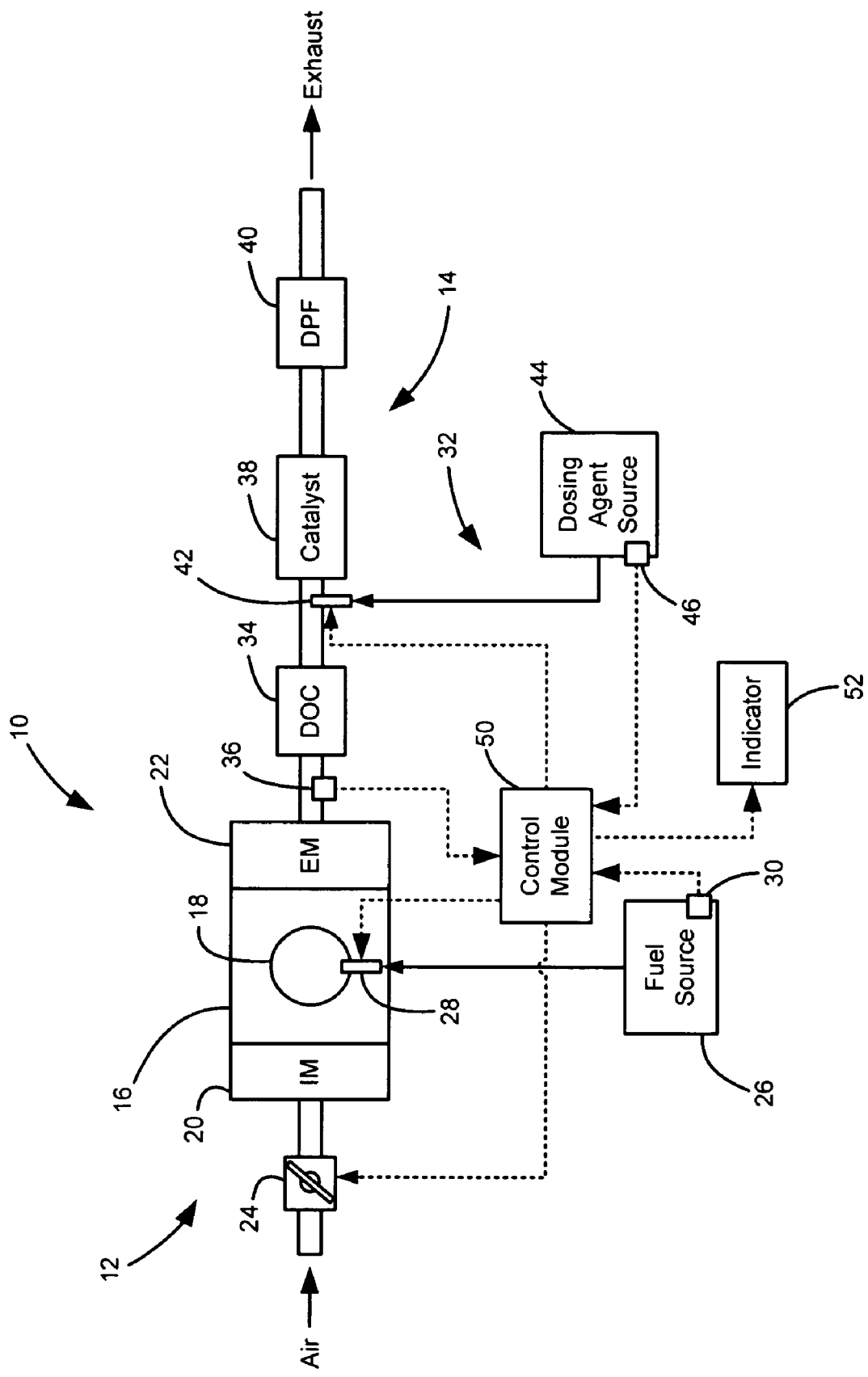
FIG. 1 is a functional block diagram of an exemplary vehicle system including an exhaust after-treatment system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle system 10 is schematically illustrated. The vehicle system 10 includes an engine system 12, an exhaust after-treatment system 14. The engine system 12 includes an engine 16 having a cylinder 18, an intake manifold 20 and an exhaust manifold 22. Air flows into the intake manifold 20 through a throttle 24. The air is mixed with fuel and the air and fuel mixture is combusted within the cylinder 18 to drive a piston (not shown). Although a single cylinder 18 is illustrated, it is appreciated that the engine 12 may include additional cylinders 18. For example, engines having 2, 3, 4, 5, 6, 8, 10, 12 and 16 cylinders are anticipated. Furthermore, although a throttle is illustrated, the present disclosure can be implemented in engine systems that do not include a throttle. The fuel is provided from a fuel source 26 and is mixed with air to form a combustion mixture. A fuel level sensor 30 is responsive to the amount of fuel within the fuel source 26.

Exhaust is produced through the combustion process and is exhausted from the cylinder 18 into the exhaust manifold 22.

The exhaust after-treatment system 14 treats the exhaust flowing therethrough to reduce emissions before being released to the atmosphere. The exhaust after-treatment system 14 includes a dosing system 32, a diesel oxidation catalyst (DOC) 34, an emissions sensor 36 and a catalyst 38 that is preferably provided as a selective catalytic (SCR) catalyst. The DOC 34 reacts with the exhaust to reduce emission levels of the exhaust. The emissions sensor 36 is responsive to an emissions (e.g., NOx) level of the exhaust. It is also anticipated that a diesel particulate filter (DPF) 40 may be located downstream from the catalyst 30 that filters diesel particulates to further reduce emissions.

The dosing system 32 includes a dosing agent injector 42, a dosing agent storage tank 44 and a dosing agent supply sensor 46. The dosing system 32 selectively injects a dosing agent (e.g., urea) into the exhaust stream to further reduce emissions. More specifically, the amount of the dosing agent is determined based on the signal generated by the exhaust sensor, which can alternatively be provided as a virtual sensor (i.e., a model based function that omits the physical sensor). The dosing agent decomposes in the exhaust and the resulting constituents react within the catalyst 38 to further reduce exhaust emissions.

A control module 50 regulates operation of the vehicle system 10 based on the extended emissions conformance control of the present invention. More specifically, the control module 50 determines a dosing agent level ($DA_{LEVEL}$) based on the signal generated by the dosing agent supply sensor 46. The control module can calculate a vehicle range ($RANGE_{DA}$) based on the amount of dosing agent remaining. More specifically, $RANGE_{DA}$ indicates the remaining drivable distance before the entire dosing agent is consumed. $RANGE_{DA}$ can be displayed on a display (not shown) to alert the vehicle operator.

If $DA_{LEVEL}$ is below a first predetermined or low dosing agent threshold value ($DA_{LOW}$), the control module 50 sets a low dosing agent flag ($FLAG_{DALOW}$) (e.g., equal to 1 or TRUE) indicating that the dosing agent level is low and should be refilled. Additionally, the control module 50 activates an indicator 52 that alerts the vehicle operator that the dosing agent supply is low and should be refilled. The indicator 52 can be a visual and/or audible indication that alerts the vehicle operator to the low condition. If $DA_{LEVEL}$ is below a second predetermined or empty dosing agent threshold value ($DA_{EMPTY}$), the control module 50 sets an empty dosing agent flag ($FLAG_{DAEMPTY}$) (e.g., equal to 1 or TRUE). Further, the control module 50 activates the indicator 52 to indicate that the dosing agent source 44 is empty. When the dosing agent source 44 is refilled and $DA_{LEVEL}$ exceeds $DA_{EMPTY}$ and/or $DA_{LOW}$, $FLAG_{DAEMPTY}$ and/or $FLAG_{DALOW}$ is/are cleared and the indicator 52 is also cleared.

The extended emissions conformance control selectively impedes vehicle operation based on the dosing agent level. More specifically, if the dosing agent monitoring control determines that the vehicle is at a convenient location, a convenient location flag ($FLAG_{CL}$) is set (e.g., equal to 1 or TRUE). A convenient location can include, but is not limited to, a fuel station, a maintenance workshop and/or an oil change workshop. If $FLAG_{DALOW}$ is set and the vehicle is stopped at a convenient location (i.e., a location where additional dosing agent is available) the extended emissions conformance control disables operation of the vehicle by setting a disable flag ($FLAG_{DIS}$) until the dosing agent is replenished. It is also anticipated, however, that the vehicle operation need not be disabled even though the vehicle is at a convenient location, but can be impeded, as described in further detail below.

The extended emissions conformance control selectively impedes operation of the vehicle. One case includes when $FLAG_{DAEMPTY}$ is set and $FLAG_{CL}$ is not set (i.e., when the vehicle is not deemed to be at a convenient location). Vehicle operation is impeded by relaxing the drivability and fuel economy constraints, and employing more aggressive modes of combustion that reduce emissions. In one embodiment, a combustion strategy, such as, for example, pre-mixed charge compression ignition (PCCI) combustion can be used. PCCI combustion is known to significantly reduce $NO_X$ and particulate emissions, however, may decrease fuel economy and increase engine noise. In an alternative embodiment, fueling levels are reduced. By lowering the fueling levels, engine power levels, $NO_X$ and particulate emissions are correspondingly reduced. In a further embodiment, the vehicle speed and/or acceleration ability (i.e., limiting the achievable rate of acceleration) of the vehicle is limited. By employing one of, or a combination of these strategies, the extended emissions conformance control enables the desired emissions performance to be achieved even though the dosing agent is depleted. As a result, an emissions compliant limp-home mode is provided without the need to disable the vehicle.

In an alternative embodiment, the extended emissions conformance control impedes vehicle operation when $FLAG_{DALOW}$ is set. In this manner, although the remaining dosing agent can be utilized in hand with the above-described engine operating modes, to maximize emissions performance, while extending the dosing agent range. For example, the fueling levels can be reduced based on $DA_{LEVEL}$ to reduce emissions, and at the same time, the remaining dosing agent can be used to further reduce emissions below the desired level. By combining fueling level reduction and dosing agent emissions reduction, the drivability and fuel economy are not as adversely affected as would be by reducing fueling levels alone to achieve the desired emissions performance.

Figure 2:
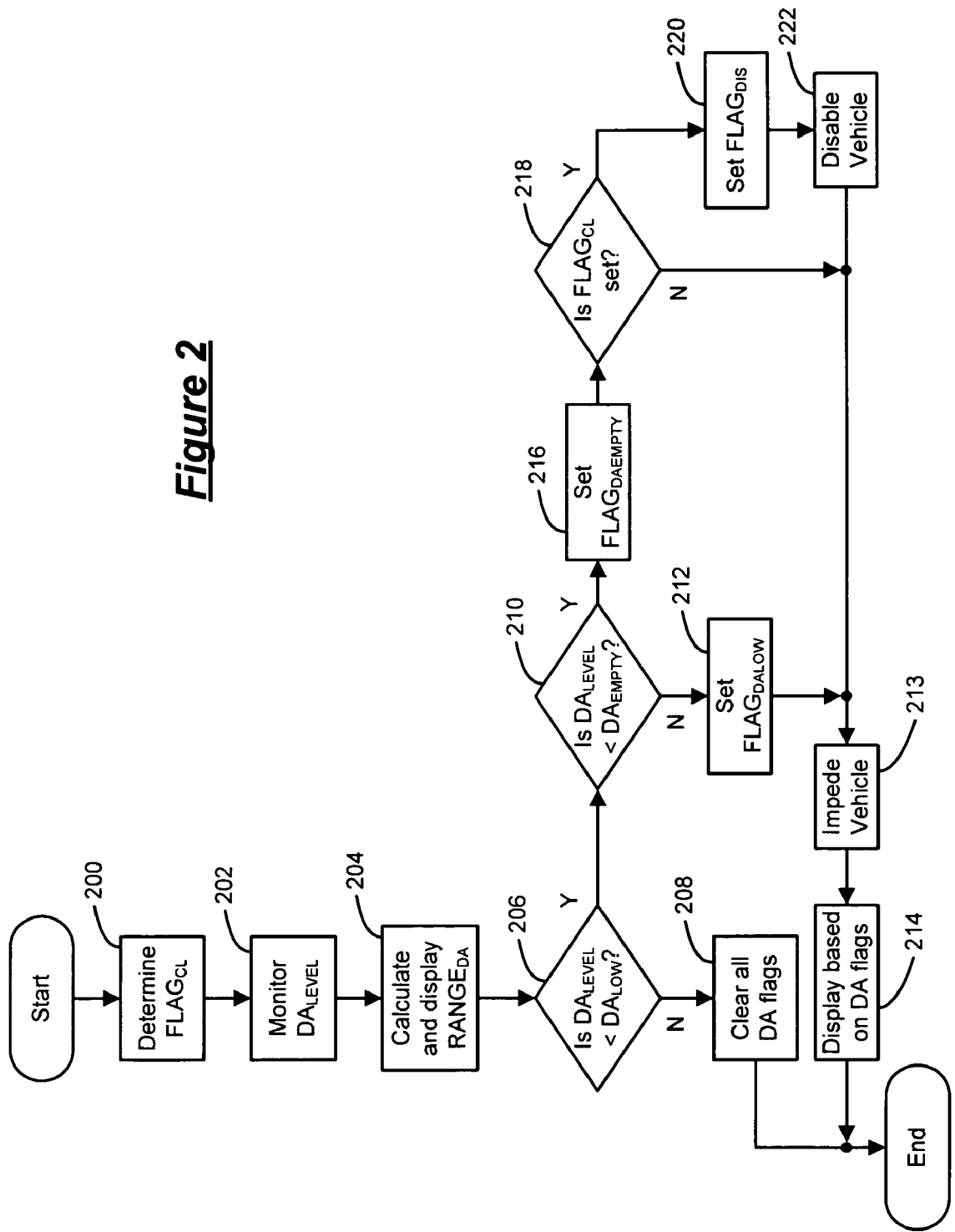
FIG. 2 is a flowchart illustrating exemplary steps executed by the extended emissions conformance control of the present invention.

Referring now to FIG. 2, exemplary steps executed by the extended emissions conformance control will be described in detail. In step 200, control determines $FLAG_{CL}$. In step 202, control monitors $DA_{LEVEL}$. Control calculates and displays $RANGE_{DA}$ in step 204 based on $DA_{LEVEL}$. In step 206, control determines whether $DA_{LEVEL}$ is less than $DA_{LOW}$. If $DA_{LEVEL}$ is not less than $DA_{LOW}$, control clears all dosing agent related flags in step 208 and control ends. If $DA_{LEVEL}$ is less than $DA_{LOW}$, control determines whether $DA_{LEVEL}$ is less than $DA_{EMPTY}$ in step 210. If $DA_{LEVEL}$ is not less than $DA_{EMPTY}$, control sets $FLAG_{DALOW}$ in step 212 and control continues in step 213. If $DA_{LEVEL}$ is less than $DA_{EMPTY}$, control sets $FLAG_{DAEMPTY}$ in step 216 and control continues in step 218.

In step 218, control determines whether $FLAG_{CL}$ is set. If $FLAG_{CL}$ is not set, control continues in step 213. If $FLAG_{CL}$ is set, control sets $FLAG_{DIS}$ in step 220. Control disables vehicle operation in step 222 and continues in step 213. In step 213, control impedes vehicle operation by implementing one of or a combination of the strategies discussed in detail above. In step 214, control displays the dosing agent status based on the dosing agent related flags and control ends. For example, "Dosing Agent Low", "Dosing Agent Empty" or "Vehicle Disable Due To Empty Dosing Agent" messages can be displayed.

Figure 3:
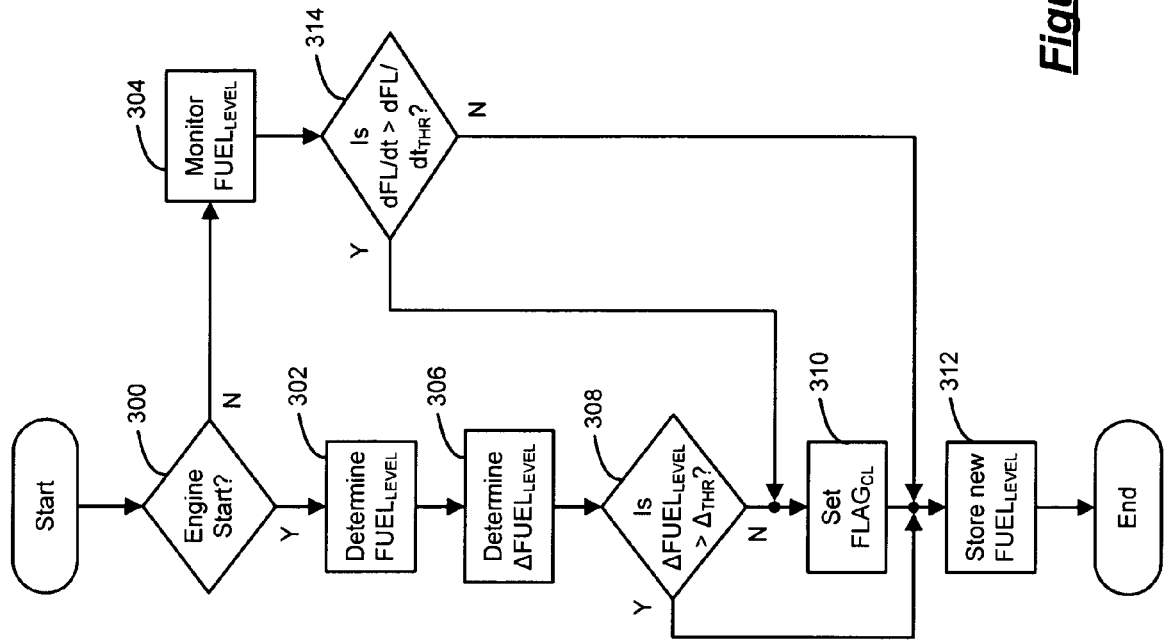
FIG. 3 is a flowchart illustrating exemplary steps executed by extended emissions conformance control to determine whether the vehicle system is stopped at a convenient location.

Referring now to FIG. 3, exemplary steps executed by the extended emissions conformance control to determine whether the vehicle is stopped at a convenient location will be described in detail. In step 300, control determines whether an engine start just occurred. If an engine start occurred, control continues in step 302. If an engine start did not occur, control continues in step 304.

In step 302, control determines $FUEL_{LEVEL}$. In step 306, control determines $\Delta FUEL_{LEVEL}$ as the difference between $FUEL_{LEVEL}$ and the fuel level that was stored in memory immediately prior to the last engine shut-off event. In step 308, control determines whether $\Delta FUEL_{LEVEL}$ is greater than a threshold difference ($\Delta_{THR}$). If $\Delta FUEL_{LEVEL}$ is greater than $\Delta_{THR}$, control determines that the vehicle was refueled during the most recent shut-down and continues in step 310. If $\Delta FUEL_{LEVEL}$ is not greater than $\Delta_{THR}$, control determines that the vehicle was not refueled during the most recent shut-down and continues in step 312.

In step 304, control continuously monitors $FUEL_{LEVEL}$. In step 314, control determines whether $FUEL_{LEVEL}$ is increasing at a rate (e.g., dFL/dt) greater than a threshold rate (e.g., $dFL/dt_{THR}$). If dFL/dt is greater than $dFL/dt_{THR}$, control determines that the vehicle is being refueled and continues in step 310. If dFL/dt is not greater than $dFL/dt_{THR}$, control determines that the vehicle is not being refueled and continues in step 312. In step 310, control sets $FLAG_{CL}$. In step 312, control stores the new or most recent $FUEL_{LEVEL}$ into memory and control ends.

Although the extended emissions conformance control is described in detail above using the fueling station scenario as an example, it is appreciated that the extended emissions conformance control can monitor other scenarios including, but not limited to, maintenance and/or oil change to determine whether the vehicle is located in a convenient location. For example, the extended emissions conformance control can monitor vehicle maintenance flags stored in memory and determine that the vehicle is at a convenient location if one or more maintenance related flags are set or reset. Alternatively, the extended emissions conformance control can monitor an oil level or an oil characteristic. For example, if the oil level ($OIL_{LEVEL}$) increases or an oil parameter ($OIL_{PAR}$) (e.g., including, but not limited to, electrical impedance) indicates that an oil change has just occurred, the extended emissions conformance control can determine that the vehicle is at a convenient location to refill the dosing agent.

Figure 4:
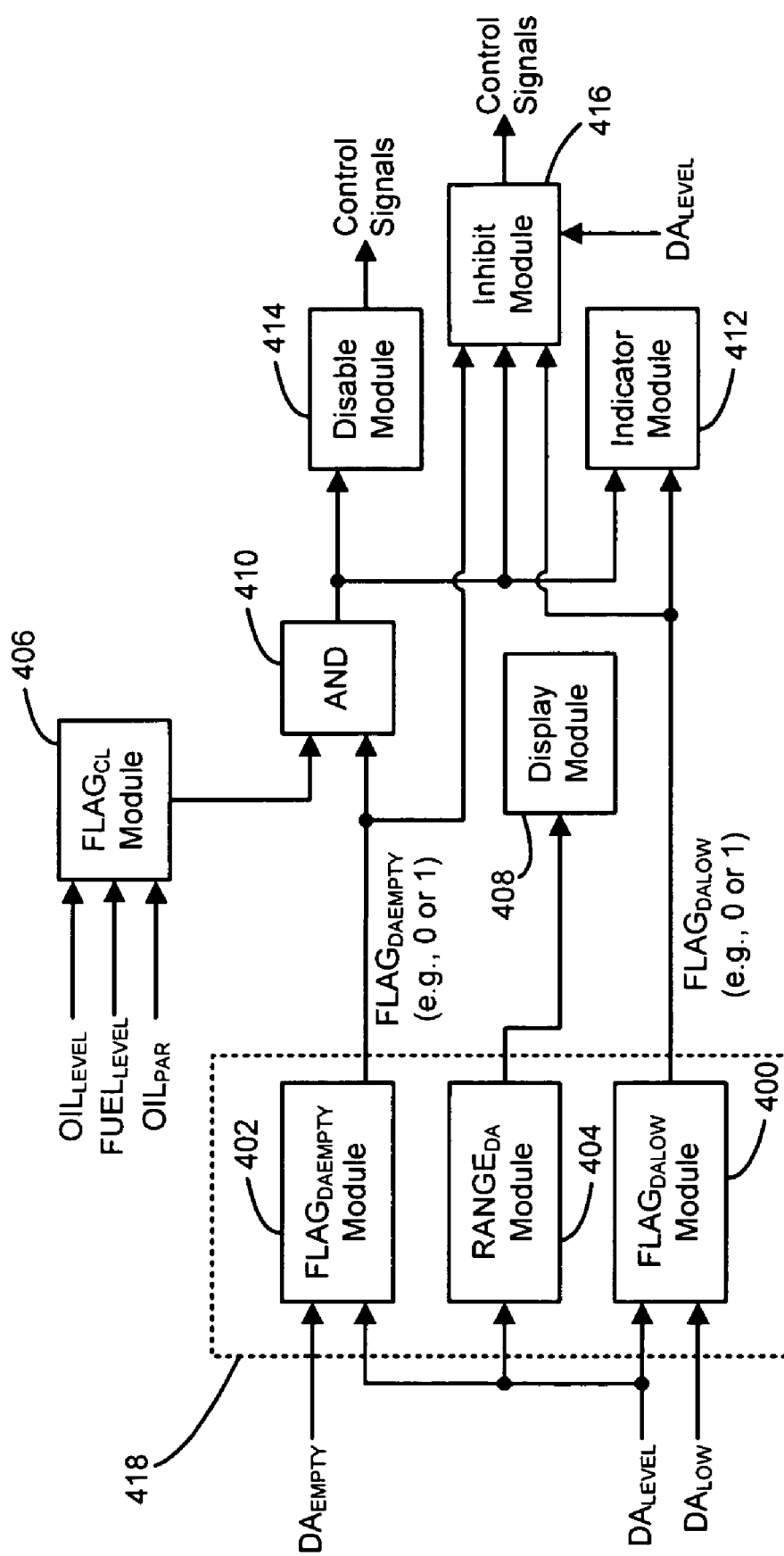
FIG. 4 is a functional block diagram illustrating exemplary modules that execute the extended emissions conformance control.

Referring now to FIG. 4, exemplary modules that execute the extended emissions conformance control of the present invention will be described in detail. The exemplary modules include a $FLAG_{DALOW}$ module 400, a $FLAG_{EMPTY}$ module 402, a $RANGE_{DA}$ module 404, a $FLAG_{CL}$ module 406, a display module 408, an AND module 410, an indicator module 412, a disable module 414 and an impede module 416. The $FLAG_{DALOW}$ module 400, the $FLAG_{EMPTY}$ module 402 and the $RANGE_{DA}$ module 404 can be individual modules or can be sub-modules within a larger module 418.

The $FLAG_{DALOW}$ module 400 selectively sets $FLAG_{DALOW}$ based on $DA_{LEVEL}$ and $DA_{LOW}$. Similarly, the $FLAG_{DAEMPTY}$ module 402 selectively sets $FLAG_{DAEMPTY}$ based on $DA_{LEVEL}$ and $DA_{EMPTY}$. The $RANGE_{DA}$ module 404 calculates $RANGE_{DA}$ based on $DA_{LEVEL}$. The $FLAG_{CL}$ module 406 selectively sets $FLAG_{CL}$ based on $FUEL_{LEVEL}$, $OIL_{LEVEL}$ and/or $OIL_{PAR}$. It is also anticipated that $FLAG_{CL}$ can be selectively set based on maintenance flags or any other factor that would indicate the vehicle is at a convenient location. The display module 408 graphically displays $RANGE_{DA}$ to alert the vehicle operator to the remaining distance the vehicle can travel before the dosing agent source is empty or below a desired level.

The AND module 410 generates a signal based on $FLAG_{DAEMPTY}$ and $FLAG_{CL}$. For example, if both $FLAG_{DAEMPTY}$ and $FLAG_{CL}$ are set (e.g., equal to 1) the AND module 410 outputs a signal indicating that the dosing agent is empty and the vehicle is located at a convenient location. The indicator module 412 generates an indication signal (e.g., audible and/or visual) based on $FLAG_{DAEMPTY}$ or $FLAG_{DALOW}$ to alert the vehicle operator to the status of the dosing agent source. The disable module 414 selectively disables vehicle operation based on the output of the AND module 410. More specifically, the disable module 414 generates control signals that disable vehicle operation until the dosing agent source is replenished. The impede module 416 selectively impedes vehicle operation based on $FLAG_{DAEMPTY}$, the output of the AND module 410, $FLAG_{DALOW}$ and/or $DA_{LEVEL}$. More specifically, the impede module 416 implements one of or a combination of the strategies described in detail above, and generates corresponding control signals.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An exhaust after-treatment system for a vehicle including a dosing agent that is selectively injected into an exhaust from a dosing agent source, comprising:
 a first module that determines a level of said dosing agent within said dosing agent source,
 wherein said dosing agent includes ammonia;
 a second module that selectively impedes vehicle operation by adjusting an engine operating mode when said level is less than a first threshold level; and
 a third module that selectively disables an engine when said level is less than a second threshold level,
 wherein said second threshold level is less than said first threshold level, and
 wherein said second threshold level corresponds to an empty dosing agent source.

2. The exhaust after-treatment system of claim 1 wherein said vehicle operation is impeded by one of reducing a fueling rate to said engine of said vehicle, limiting an operating speed of said engine, limiting an operating speed of said vehicle, limiting an acceleration rate of said vehicle and altering a combustion mode of said engine.

3. The exhaust after-treatment system of claim 2 wherein said fueling rate is determined based on said level.

4. The exhaust after-treatment system of claim 2 wherein said combustion mode is altered to be a pre-mixed charge compression ignition (PCCI) combustion mode.

5. The exhaust after-treatment system of claim 1 wherein said second module discontinues inhibiting vehicle operation when said dosing agent source is replenished to raise said level above said first threshold level.

6. A method of extending emissions performance of an exhaust after-treatment system of a vehicle that includes a dosing agent, comprising:
 determining a level of said dosing agent within a dosing agent source,
 wherein said dosing agent includes ammonia;
 selectively impeding vehicle operation by adjusting an engine operating mode when said level is less than a first threshold level; and
 selectively rendering said vehicle unable to drive when said level is less than a second threshold level,
 wherein said second threshold level is less than said first threshold level, and wherein said second threshold level corresponds to an empty dosing agent source.

7. The method of claim 6 wherein said vehicle operation is impeded by one of reducing a fueling rate to an engine of said vehicle, limiting an operating speed of said engine, limiting an operating speed of said vehicle, limiting and acceleration rate of said vehicle and altering a combustion mode of said engine.

8. The method of claim 7 further comprising determining said fueling rate based on said level.

9. The method of claim 7 wherein said combustion mode is altered to be a pre-mixed charge compression ignition (PCCI) combustion mode.

10. The method of claim 6 further comprising discontinuing inhibiting vehicle operation when said dosing agent source is replenished to raise said level above said first threshold level.

11. A method of extending emissions performance of an exhaust after-treatment system of a vehicle that includes a dosing agent, comprising:
    determining a level of said dosing agent within a dosing agent source,
    wherein said dosing agent includes ammonia;
    determining whether a vehicle is at a predetermined type of location;
    selectively impeding vehicle operation by adjusting an engine operating mode when said level is less than a first threshold level and said vehicle is not at said predetermined type of location; and
    selectively disabling operation of said vehicle when said level is less than a second threshold level,
    wherein said second threshold level is less than said first threshold level, and
    wherein said second threshold level corresponds to an empty dosing agent source.

12. The method of claim 11 wherein said vehicle operation is impeded by one of reducing a fueling rate to an engine of said vehicle, limiting an operating speed of said engine, limiting an operating speed of said vehicle, limiting and acceleration rate of said vehicle and altering a combustion mode of said engine.

13. The method of claim 12 further comprising determining said fueling rate based on said level.

14. The method of claim 12 wherein said combustion mode is altered to be a pre-mixed charge compression ignition (PCCI) combustion mode.

15. The method of claim 11 further comprising discontinuing inhibiting vehicle operation when said dosing agent source is replenished to raise said level above said first threshold level.

16. The method of claim 11 further comprising disabling operation of said vehicle when said level is less than said second threshold level and said vehicle is at said predetermined type of location.

17. The method of claim 11 further comprising selectively determining whether said vehicle is at said predetermined type of location based one of a change in a fuel level, a rate of increase of said fuel level, a change in one or more maintenance related flags, an oil level, and an oil parameter.

18. The method of claim 17 further comprising selectively determining that said vehicle is at said predetermined type of location when at least one of said change in fuel level is greater than a threshold and said rate of increase of said fuel level is greater than a threshold rate.

19. The method of claim 17 further comprising selectively determining that said vehicle is at said predetermined type of location when said oil level increases.

* * * * *